(12) United States Patent
Lee

(10) Patent No.: US 10,078,171 B2
(45) Date of Patent: Sep. 18, 2018

(54) BACK LIGHT UNIT AND DISPLAY APPARATUS INCLUDING THE SAME

(71) Applicant: SAMSUNG ELECTRONICS CO., LTD., Suwon-si, Gyeonggi-do (KR)

(72) Inventor: Kye Hoon Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 181 days.

(21) Appl. No.: 15/059,794

(22) Filed: Mar. 3, 2016

(65) Prior Publication Data

US 2016/0363709 A1 Dec. 15, 2016

(30) Foreign Application Priority Data

Jun. 12, 2015 (KR) .................. 10-2015-0083312

(51) Int. Cl.
*F21V 9/16* (2006.01)
*F21V 8/00* (2006.01)
(Continued)

(52) U.S. Cl.
CPC ........... *G02B 6/005* (2013.01); *G02B 6/0065* (2013.01); *G02B 6/0073* (2013.01);
(Continued)

(58) Field of Classification Search
CPC .... G02B 6/005; G02B 6/0055; G02B 6/0065; G02B 6/0073; G02F 1/133615;
(Continued)

(56) References Cited

U.S. PATENT DOCUMENTS 9,199,842 B2 * 12/2015 Dubrow ................. B82Y 20/00
9,535,206 B2 * 1/2017 You ........................ G02B 6/005
(Continued)

FOREIGN PATENT DOCUMENTS

KR 10-2014-0094806 7/2014
WO 2012/064562 5/2012
(Continued)

OTHER PUBLICATIONS

Search Report dated Jun. 22, 2016 in counterpart International Application No. PCT/KR2016/002343.
(Continued)

*Primary Examiner* — Peggy Neils
(74) *Attorney, Agent, or Firm* — Nixon & Vanderhye P.C.

(57) ABSTRACT

Disclosed herein are a back light unit including a quantum dot sheet capable of recycling light converted by quantum dots, and a display apparatus including the back light unit. The back light unit according to an example includes: a light source; and a quantum dot sheet configured to convert light generated in the light source into white light, wherein the quantum dot sheet includes a fluorescent member including quantum dots; a first barrier film disposed on the rear surface of the fluorescent member; and a second barrier film disposed on the front surface of the fluorescent member, and having a predetermined reflectivity to reflect the white light converted by the fluorescent member backward toward the fluorescent member.

19 Claims, 11 Drawing Sheets

(51) Int. Cl.
*G02F 1/1335* (2006.01)
*G02F 1/017* (2006.01)

(52) U.S. Cl.
CPC ...... *G02F 1/133615* (2013.01); *G02B 6/0055* (2013.01); *G02F 1/133536* (2013.01); *G02F 2001/01791* (2013.01); *G02F 2001/133614* (2013.01); *G02F 2202/36* (2013.01)

(58) Field of Classification Search
CPC .......... G02F 2001/01791; G02F 2001/133614; G02F 2202/36; F21V 9/16; F21K 9/00
See application file for complete search history.

(56) References Cited

U.S. PATENT DOCUMENTS

| | | | |
|---|---|---|---|
| 9,594,203 B2* | 3/2017 | Lee | G02B 5/23 |
| 9,903,544 B2* | 2/2018 | Kurita | F21K 9/64 |
| 2012/0113672 A1 | 5/2012 | Dubrow et al. | |
| 2013/0215645 A1 | 8/2013 | Jang et al. | |
| 2014/0153280 A1 | 6/2014 | Lee | |
| 2015/0055058 A1 | 2/2015 | Jang et al. | |
| 2015/0308658 A1 | 10/2015 | Shin et al. | |
| 2016/0327690 A1 | 11/2016 | Tokinoya et al. | |
| 2017/0192146 A1* | 7/2017 | Yamada | G02B 6/005 |
| 2017/0248809 A1* | 8/2017 | Oba | G02F 1/1336 |

FOREIGN PATENT DOCUMENTS

| | | |
|---|---|---|
| WO | 2014/115992 | 7/2014 |
| WO | 2015/025950 | 2/2015 |
| WO | 2016/010116 | 1/2016 |

OTHER PUBLICATIONS

Extended Search Report dated Jun. 27, 2016 in counterpart European Application No. 16163011.6.
Examination Report dated Mar. 21, 2017 in counterpart European Patent Application No. 16163011.6.
European Office Action dated Mar. 28, 2018 for EP Application No. 16163011.6.

* cited by examiner

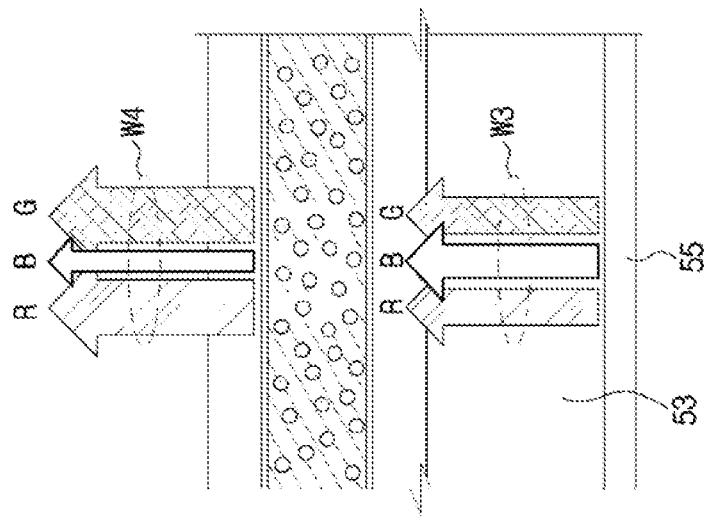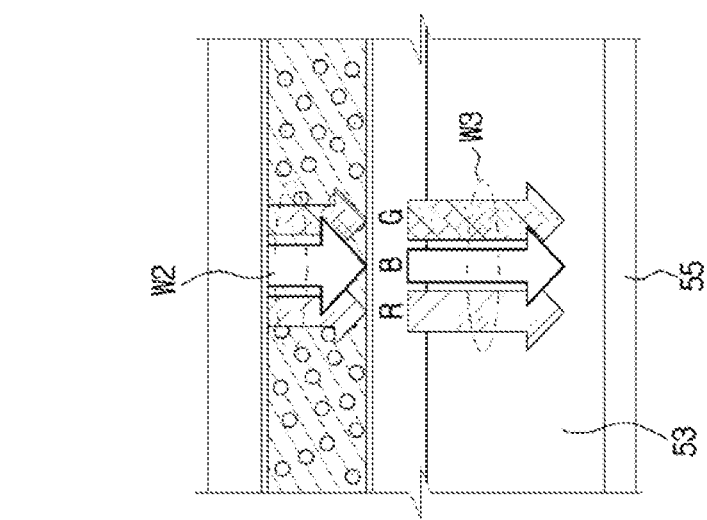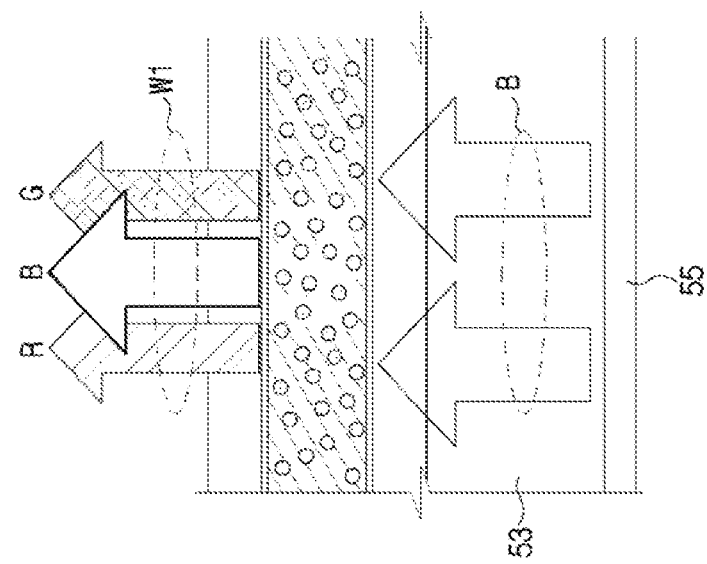

BACK LIGHT UNIT AND DISPLAY APPARATUS INCLUDING THE SAME

CROSS-REFERENCE TO RELATED APPLICATION

This application is based on and claims priority under 35 U.S.C. § 119 to Korean Patent Application No. 2015-0083312, filed on Jun. 12, 2015 in the Korean Intellectual Property Office, the disclosure of which is incorporated by reference herein in its entirety.

BACKGROUND

1. Field

The disclosure relates to a display apparatus, and for example, to a display apparatus including a back light unit.

2. Description of Related Art

A display apparatus includes a display panel for displaying images to display broadcasting signals or various formats of image data.

The display panel includes a self-emissive display panel and a non-emissive display panel. The self-emissive display panel includes a Cathode Ray Tube (CRT) panel, an Electro Luminescence (EL) panel, an Organic Light Emitting Diode (OLED) panel, a Vacuum Fluorescence Display (VFD) panel, a Field Emission Display (FED) panel, a Plasma Display Panel (PDP) panel, etc., and the non-emissive display panel includes a Liquid Crystal Display (LCD) panel.

The LCD panel includes a back light unit to emit white light, and a display panel to transmit or block light emitted from the back light unit.

SUMMARY

Therefore, it is an aspect of the disclosure to provide a back light unit including a quantum dot sheet and configured to recycle light converted by quantum dots, and a display apparatus including the back light unit.

Additional aspects of the disclosure will be set forth in part in the description which follows and, in part, will be apparent from the description.

In accordance with one example of the disclosure, a back light unit includes: a light source; and a quantum dot sheet configured to convert light generated in the light source into white light, wherein the quantum dot sheet includes: a fluorescent member including quantum dots; a first barrier film disposed on a rear surface of the fluorescent member; and a second barrier film disposed on a front surface of the fluorescent member, and having a predetermined reflectivity to reflect the white light converted by the fluorescent member backward or toward the fluorescent member.

The second barrier film may, for example, have reflectivity in a range of 4 to 15%.

The second barrier film may reflect predetermine portions of red light, green light, and blue light converted by the fluorescent member backward.

The back light unit may further include a reflector sheet provided behind the quantum dot sheet, and configured to reflect light propagated backward from the quantum dot sheet toward the quantum dot sheet.

The light source may include a light emitting diode configured to generate blue light.

The back light unit may further include an optical sheet provided in front of the quantum dot sheet, and configured to refract or reflect light output from the quantum dot sheet.

The optical sheet may include at least one of a microlens sheet, a prism sheet, and a Double Brightness Enhancement Film (DBEF).

The second barrier film may include particles to scatter the white light converted by the fluorescent member.

The back light unit may further include: a light guide plate provided on the rear surface of the quantum dot sheet, and configured to scatter the light generated in the light source and to emit the scattered light through a front surface of the light guide plate; and a reflector sheet configured to reflect light exiting a rear surface of the light guide plate toward the light guide plate.

In accordance with another example of the disclosure, a quantum dot sheet includes: a fluorescent member including quantum dots; a first barrier film disposed on a rear surface of the fluorescent member; and a second barrier film disposed on a front surface of the fluorescent member, and having predetermined reflectivity to reflect white light converted by the fluorescent member backward toward the fluorescent member.

In accordance with another example of the disclosure, a display apparatus includes: a display panel; a back light unit configured to output light to the display panel; and an optical sheet configured to refract or reflect light output from the back light unit and to provide the refracted or reflected light to the display panel, wherein the back light unit includes: a light source; and a quantum dot sheet configured to convert light generated in the light source into white light, and to reflect a predetermined portion of the white light backward.

The quantum dot sheet may include: a fluorescent member including quantum dots; a first barrier film disposed on a rear surface of the fluorescent member; and a second barrier film disposed on a front surface of the fluorescent member, and having predetermined reflectivity to reflect the white light converted by the fluorescent member backward toward the fluorescent member.

The second barrier film may, for example, have reflectivity in a range of 4 to 15%.

The second barrier film may reflect predetermined portions of red light, green light, and blue light converted by the fluorescent member backward.

The display apparatus may further include a reflector sheet provided behind the quantum dot sheet, and configured to reflect light propagated backward from the quantum dot sheet toward the quantum dot sheet.

The light source may include a light emitting diode configured to generate blue light.

The optical sheet may include at least one of a microlens sheet, a prism sheet, and a Double Brightness Enhancement Film (DBEF).

The second barrier film may include particles to scatter the white light converted by the fluorescent member.

The display apparatus may further include: a light guide plate provided on the rear surface of the quantum dot sheet and configured to scatter the light generated in the light source and to emit the scattered light through a front surface of the light guide plate; and a reflector sheet configured to reflect light exiting a rear surface of the light guide plate toward the light guide plate.

BRIEF DESCRIPTION OF THE DRAWINGS

These and/or other aspects of the disclosure will become apparent and more readily appreciated from the following detailed description, taken in conjunction with the accompanying drawings, in which like reference numerals refer to like elements, and wherein:

FIGS. 6A-6C are views illustrating an example light recycle in a quantum dot sheet of a back light unit;

DETAILED DESCRIPTION

Configurations illustrated in the examples and the drawings described in the disclosure are merely examples of the disclosure, and thus it is to be understood that various modified examples, which may replace the examples and the drawings described in the disclosure, are possible.

The terms used in the disclosure are used to describe the examples of the disclosure. Accordingly, it should be apparent to those skilled in the art that the following description of example embodiments of the disclosure is provided for illustration purpose only and not for the purpose of limiting the disclosure as defined by the appended claims and their equivalents. It is to be understood that the singular forms "a," "an," and "the" include plural references unless the context clearly dictates otherwise. It will be understood that when the terms "includes," "comprises," "including," and/or "comprising," when used in this disclosure, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

As used herein, the terms "unit", "device, "block", "member", or "module" refers to a unit that can perform at least one function or operation, and may be implemented as a software or hardware component such as circuitry, a Field Programmable Gate Array (FPGA) or an Application Specific Integrated Circuit (ASIC). However, the term "unit", "device", "block", "member", or "module" is not limited to software or hardware. The "unit", "device", "block", "member", or "module" may be stored in accessible storage medium, or may be configured to run on at least one processor.

Examples of the disclosure will be described with reference to the appended drawings.

Figure 1:
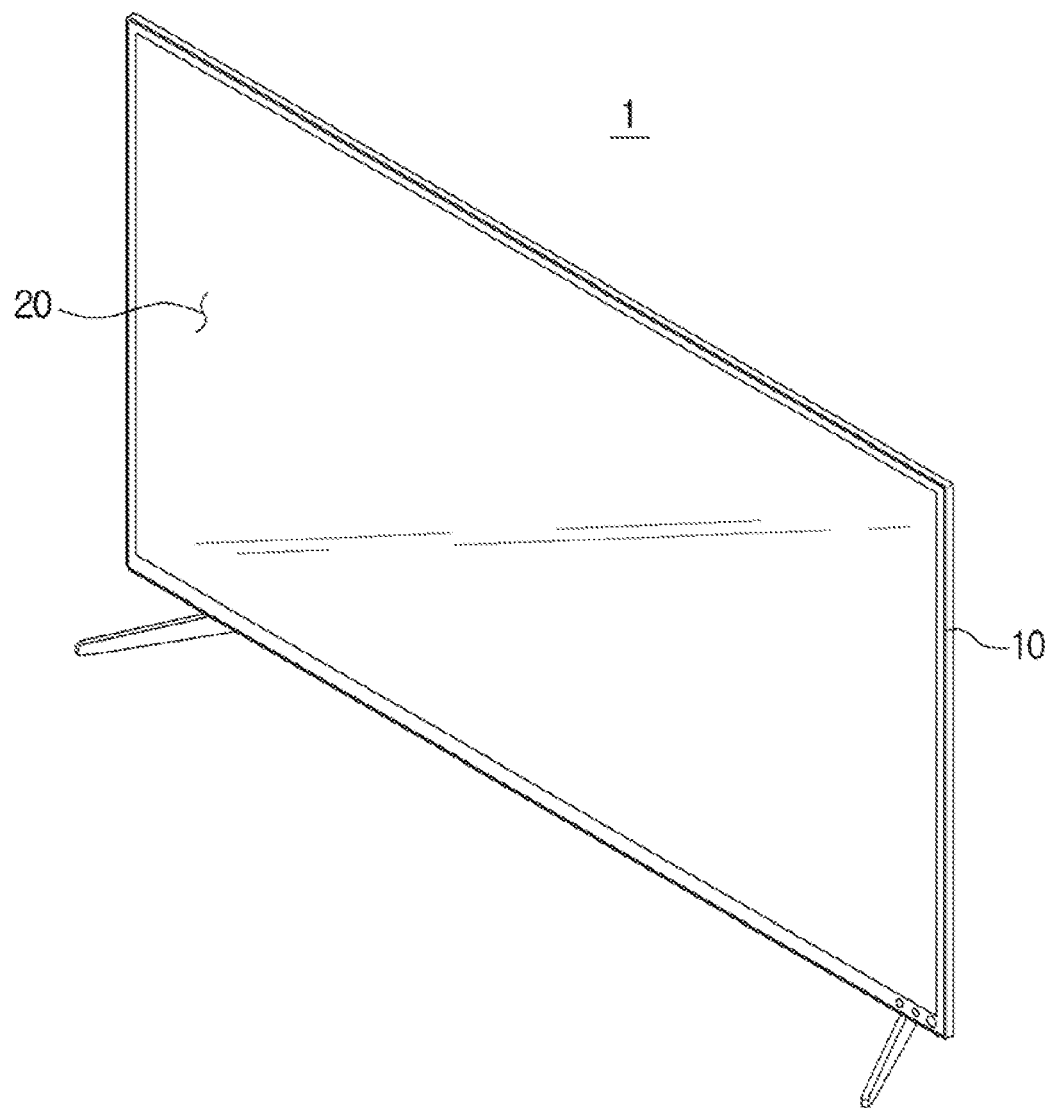
FIG. 1 illustrates an example external appearance of a display apparatus.
Figure 2:
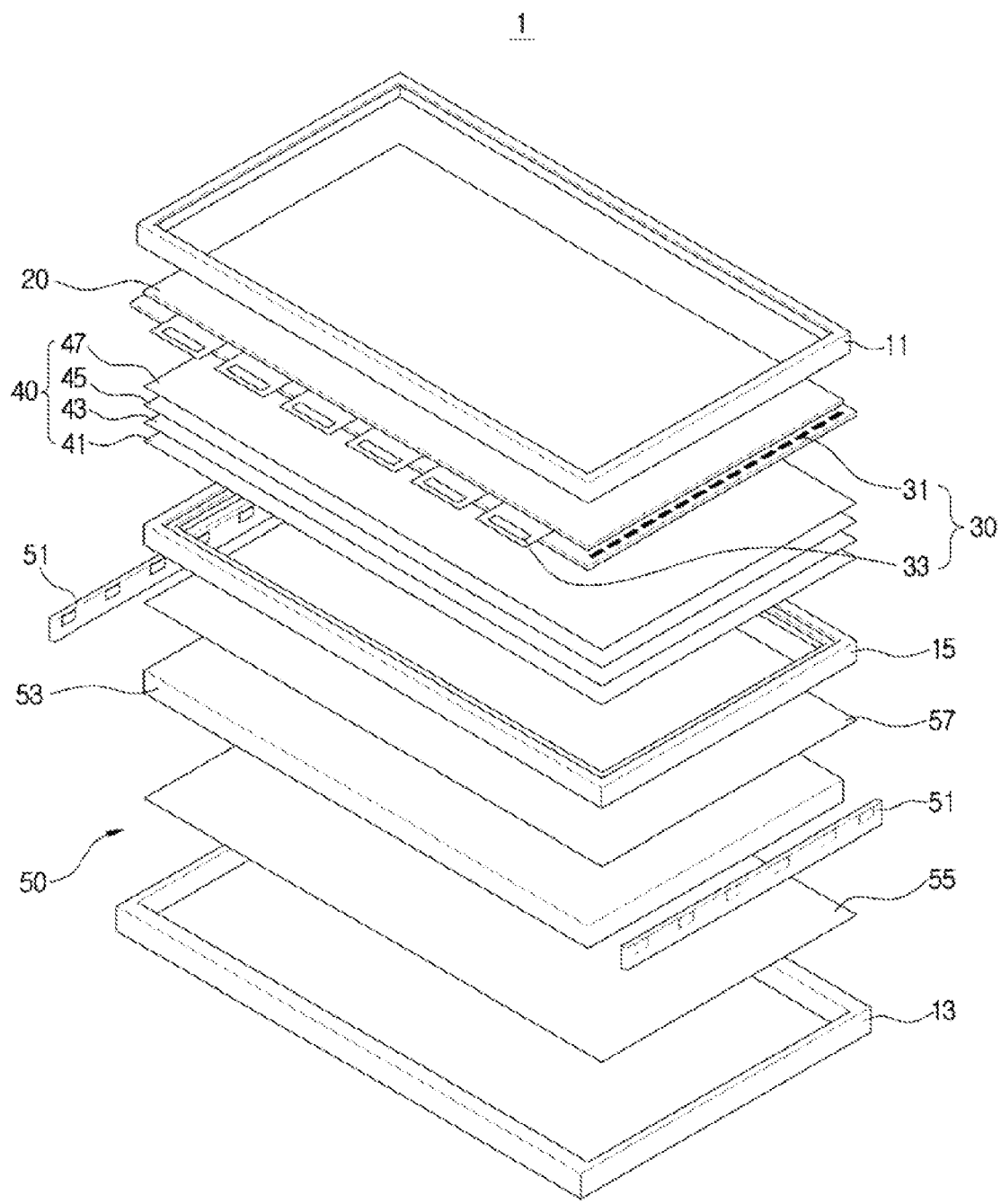
FIG. 2 is an exploded perspective view illustrating an example display apparatus.
Figure 3:
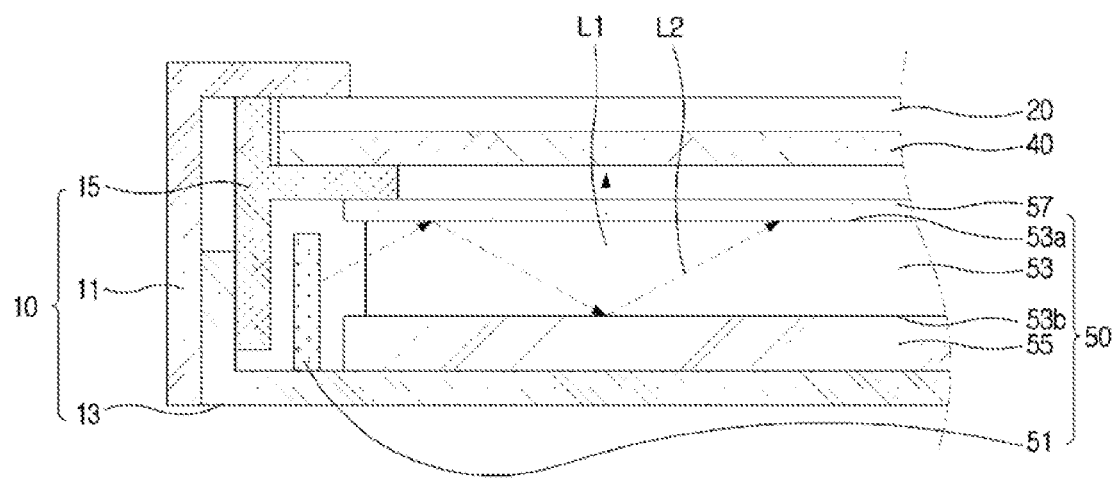
FIG. 3 is a cross-sectional view illustrating an example display apparatus.

FIG. 1 illustrates an external appearance of an example display apparatus, FIG. 2 is an exploded perspective view illustrating an example display apparatus, and FIG. 3 is a cross-sectional view illustrating an example display.

Referring to FIG. 1, a display apparatus 1 includes, for example, an apparatus capable of processing image signals to create an image, and visually displaying the image.

Hereinafter, an example in which the display apparatus 1 is television (TV) is illustrated. However, the display apparatus 1 may be any other device, such as a monitor, a portable multimedia device, a portable communication device, or the like, which can visually display images.

Referring to FIGS. 1 to 3, the display apparatus 1 may include a main body 10 to accommodate various components, and a display panel 20 to display an image that a user can recognize. The main body 10 may, for example, include a driving circuit 30, a back light unit 50, and an optical sheet 40.

The main body 10 may include a top chassis 11 provided in the front part of the display apparatus 1, a bottom chassis 13 provided in the back part of the display apparatus 1, and a frame 15 provided in the inside of the display apparatus 1.

The top chassis 11 may be disposed to surround a surface of the display panel 20 on which images are displayed, thus preventing the edges of the display panel 20 from being exposed to the outside.

The bottom chassis 13 may be disposed to surround the other surface of the display panel 20, which is opposite to the surface on which images are displayed, thus preventing various components included in the display apparatus 1 from being exposed to the outside. Also, the bottom chassis 13 may protect various components included in the display apparatus 1 from an external impact.

The frame 15, such as, for example, a mold frame, may limit movements of the display panel 20, the optical sheet 40, and the back light unit 50, and fix the display panel 20, the optical sheet 40, and the back light unit 50 in between the top chassis 11 and the bottom chassis 13.

The display panel 20 may display various images based on image signals received from the outside. The display panel 20 may be a self-emissive display panel in which a plurality of pixels configuring the display panel 20 themselves emit light to create an image, or a non-emissive display panel in which a plurality of pixels reflect/transmit/block light to create an image.

In the following description, the display panel 20 is a non-emissive display panel to reflect/transmit/block light emitted from the back light unit 50 to create an image.

The display panel 20 may, for example, include a liquid crystal layer (not shown), a pair of transparent electrode layers (not shown), a pair of transparent substrates (not shown), and a color filter array (not shown).

The liquid crystal layer may include liquid crystal, wherein the liquid crystal is a material in the intermediate state between crystal and liquid. The liquid crystal may show optical properties based on a change of an applied voltage. For example, the liquid crystal may change its molecular arrangement based on a change of an applied electric field.

On both sides of the liquid crystal layer, the pair of transparent electrode layers may be provided to form an electric field in the liquid crystal layer. An electric field that is applied to the liquid crystal layer may change based on a voltage applied between the pair of transparent electrode layers.

The transparent electrode layers may include a plurality of gate lines (not shown), a plurality of data lines (not shown), and a plurality of thin film transistors (TFTs) (not shown).

The gate lines may be arranged in a row direction to turn on/off the TFTs based on gate signals, and the data lines may be arranged in a column direction to transfer data signals to the plurality of pixels through the TFTs. An electric field that is applied to the liquid crystal layer may change based on the gate signals input through the gate lines and the data signals input through the data lines, and the change of the electric field may change the molecular arrangement of liquid crystal. Also, the molecular arrangement of liquid crystal enables the liquid crystal layer to transmit or block light.

The gate lines and the data lines may, for example, comprise Indium Tin Oxide (ITO) or Indium Zinc Oxide (IZO).

The pair of transparent substrates (not shown) may form an external appearance of the display panel 20, and protect the liquid crystal layer and the transparent electrode layers. The transparent substrates may be fabricated with tempered glass or a transparent film having high light transmittance.

The color filter layer may include a red filter, a blue filter, and a green filter formed in an area corresponding to each pixel so that the plurality of pixels configuring the display panel 20 can display colors independently.

As such, the display panel 20 may block or transmit light generated by the back light unit 50 which will be described below, to thereby create an image. For example, the individual pixels configuring the display panel 20 may block or transmit light emitted from the back light unit 50 to thereby create an image having various colors.

The driving circuit 30 may provide a driving signal for driving the display panel 20 to the display panel 20. The driving circuit 30 may include a gate driving circuit 31 and a data driving circuit 33.

The gate driving circuit 31 may be connected to the gate lines of the display panel 20 to transfer gate signals to the gate lines. Also, the data driving circuit 33 may be connected to the data lines of the display panel 20 to transfer data signals to the data lines.

The back light unit 50 may be disposed behind (i.e., in a direction opposite the exposed portion of the display panel that is viewed by a user) the display panel 20, and generate light that is used by the display panel 20 to create an image. The back light unit 50 may, for example, be an edge type back light unit in which light sources are disposed along edges, or a direct type back light unit in which light sources are disposed behind the display panel 20.

In the following description, the back light unit 50 is an edge type back light unit in which light sources are disposed along edges, however, a quantum dot sheet 57 which will be described below may also be applied to a direct type back light unit.

The back light unit 50 may include, as illustrated in FIG. 3, a light source 51 configured to generate light, a light guide plate 53 configured to convert light generated by the light source 51 into sheet light, a reflector sheet 55 provided behind the light guide plate 53 and configured to reflect light output rearward from the light guide plate 53, and a quantum dot sheet 57 configured to receive light from the light guide plate 53 and to output white light (light resulting from mixing light of various colors). If the back light unit 50 is a direct type back light unit, a plurality of light sources may be arranged on the front surface of the reflector sheet 55, and a diffusion plate, instead of the light guide plate 53, may be used.

The light source 51 may, as illustrated in FIG. 3, be positioned along an edge of the light guide plate 53, to output light toward the light guide plate 53.

The light source 51 may output light (monochromatic light) of a single wavelength (single color), or light (white light) resulting from mixing light of a plurality of wavelengths. Since the back light unit 50 includes the quantum dot sheet 57, the light source 51 may be a light source of outputting monochromatic light, for example, light of a blue color having a short wavelength. In the following description of an example of the disclosure, the light source 51 outputs light of a blue color (hereinafter, simply referred to as blue light).

The light source 51 may be Light Emitting Diode (LED) or Cold Cathode Fluorescence Lamp (CCFL) having a low amount of heat generation.

In the edge type back light unit 50, the light guide plate 53 may change a propagating direction of light incident to the lateral side of the light guide plate 53 so as to cause the light to exit a front surface 53a of the light guide plate 53. In order to change the propagating direction of light, a plurality of, for example, convex stripe patterns may be formed on the front surface 53a of the light guide plate 53, and a plurality of dots may be formed on the rear surface 53b of the light guide plate 53. The sizes and intervals of the convex stripe patterns and the dots may be adjusted to uniformly emit light toward the front surface 53a of the light guide plate 53.

The convex stripe patterns formed on the front surface 53a of the light guide plate 53 may, for example, be patterns embossed through a printing method, and the dots formed on the rear surface 53b of the light guide plate 53 may, for example, be dots engraved using laser.

As illustrated in FIG. 3, a part L1 of light incident to the inside of the light guide plate 53 may be scattered by the dots formed on the rear surface 53b of the light guide plate 53 and then exit the front surface 53a of the light guide plate 53, and the other part L2 of the light may be reflected inside the light guide plate 53 by the reflector sheet 55 provided on the rear surface 53b of the light guide plate 53. The reflected light L2 may arrive at the center area of the light guide plate 53, and be scattered at the center area of the light guide plate 53 to then exit the front surface 53a of the light guide plate 53.

Due to refraction, reflection, and scattering of light occurring inside the light guide plate 53, the light guide plate 53 may emit light uniformly or substantially uniformly through the front surface 53a of the light guide plate 53.

The light guide plate 53 may, for example, comprise poly methyl methacrylate (PMMA) or polycarbonate (PC) having transparency and high strength.

The reflector sheet 55 may, for example, be provided on the rear surface of the light guide plate 53, as described above, and may reflect a part of light arriving at the rear surface 53a of the light guide plate 53 back to the inside of the light guide plate 53.

The reflector sheet 55 may, for example, be fabricated by coating a base material with a material having high reflectivity. For example, the reflector sheet 55 may be fabricated by coating a base material such as polyethylene terephthalate (PET) with polymer having high reflectivity.

Figure 4:
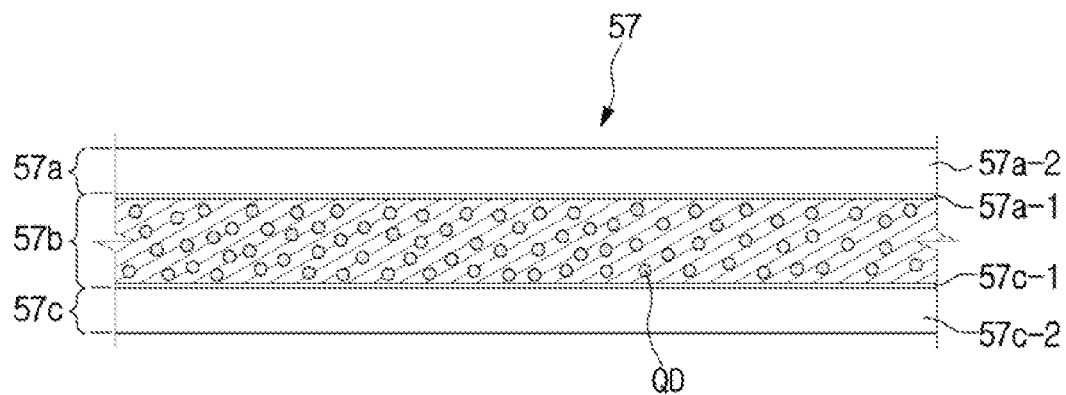
FIG. 4 illustrates an example quantum dot sheet of a display apparatus.

The quantum dot sheet 57 may convert the light exiting the front surface 53b of the light guide plate 53 into white light. FIG. 4 illustrates an example quantum dot sheet 57 of the disclosure.

As illustrated in FIG. 4, the example quantum dot sheet 57 may include a fluorescent member 57b including quantum dots QD, and barrier films configured to prevent the quantum dots QD from being exposed to oxygen or moisture. The barrier films may, for example, include a first barrier film 57c disposed on the rear surface of the fluorescent member 57b, and a second barrier film 57a disposed on the front surface of the fluorescent member 57b.

A quantum dot QD is typically a small substantially globe-shaped semiconductor particle having a nanometer size (nm, 1/1,000,000,000 m), and may comprise a central body having a size of about 2 to 10 nm and a shell comprising, for example, of zinc sulfide ZnS. The central body of the quantum dot QD may, for example, comprise cadmium selenite CdSe, cadmium telluride CdTe, or cadmium sulfide CdS.

If a voltage is applied to the quantum dot QD, the quantum dot QD emits light or absorbs light to emit light of a specific wavelength.

The electrons of the quantum dots QD are at a low energy level (or band) in a stable state. In this state, if the quantum dots QD absorb light from the outside, the electrons at the low energy level transit to a high energy level (or band). Since the electrons at the high energy level are in an unstable state, the electrons again transit from the high energy level to the low energy level. When the electrons transit from the high energy level to the low energy level, the electrons may emit light corresponding to an energy difference between the high energy level and the low energy level. The wavelength of the emitted light may be decided based on the energy difference between the high energy level and the low energy level.

For example, the smaller size of a quantum dot QD emits light of the shorter wavelength, and the larger size of a quantum dot QD emits light of the longer wavelength. For example, a quantum dot QD having a diameter of 2 nm may emit blue light, and a quantum dot QD having a diameter of about 10 nm may emit red light.

Quantum dots QD of various sizes may be used to output various wavelengths of light ranging from red light to blue light. In other words, quantum dots QD having various sizes may be used to generate light (white light) having natural colors. The fluorescent member 57b of the quantum dot sheet 57 may, for example, be fabricated by distributing the quantum dots QD in a resin. The resin may, for example, be made of a polymer acrylate resin material.

Each of the barrier films 57a and 57c may, for example, comprise polyethylene terephthalate (PET), and may include a transparent film to protect the fluorescent member 57b from an external force, and a barrier layer coated on the transparent film in order to prevent moisture and oxygen from permeating the fluorescent member 57b. The barrier layer may also comprise silicon oxide SiO or $SiO_2$ for transparency.

The first barrier film 57c of the quantum sheet 57 may be transparent to transmit light, whereas the second barrier film 57a may, for example, have predetermined reflectivity to reflect light generated in the fluorescent member 57b backward toward the fluorescent member 57b based on the predetermined reflectivity. This will be described below, together with the following description about light recycle.

If light is incident to the quantum sheet 57 from the light guide plate 53, the incident light may excite electrons of the quantum dots QD included in the quantum dot sheet 57. In other words, electrons at a low energy level (or band) of the quantum dots QD may transit to a high energy level (or band) because of the incident light.

When the excited electrons transit from the high energy level to the low energy level, the quantum dots QD may output light of various wavelengths based on their sizes. The light of various wavelengths may form an image through the optical sheet 40 and the display panel 20.

As described above, the back light unit 50 may include the light source 51, the light guide plate 53, the reflector sheet 55, and the quantum dot sheet 57 to emit uniform sheet light.

The optical sheet 40 may refract or scatter light in order to widen a viewing angle of the display apparatus 1 and increase the brightness of the display apparatus 1. The optical sheet 40 may include various sheets. For example, the optical sheet 40 may include a diffusion sheet 41, a prism sheet 43, a protection sheet 45, and a Double Brightness Enhancement Film (DBEF) 47 (see FIG. 2).

The diffusion sheet 41 may diffuse light emitted from the back light unit 50 over the surface so that the entire screen of the display apparatus 1 shows substantially uniform colors and brightness. Since the light emitted from the light guide plate 53 passed through the patterns formed on the front surface 53a of the light guide plate 53, the patterns formed on the front surface 53a of the light guide plate 53 may be recognized from the light emitted from the light guide plate 53.

In order to prevent and/or reduce the patterns formed on the front surface 53a of the light guide plate 53 from being recognized from the light emitted from the light guide plate 53, the diffusion sheet 41 may diffuse the light emitted from the light guide plate 53 in a direction that is vertical to the emitting direction of the light.

In other words, the diffusion sheet 41 may diffuse light emitted from the back light unit 50 to maintain the brightness of the entire screen to be substantially uniform. According to another example, instead of the diffusion sheet 41, a microlens sheet which can diffuse light, like the diffusion sheet 41, and widen a viewing angle may be used.

While the light passing through the diffusion sheet 41 is diffused in the direction that is vertical to the surface of the diffusion sheet 41, the brightness of the light may be sharply reduced. The prism sheet 43 may refract or focus the light diffused by the diffusion sheet 41 to thereby increase the brightness of the light.

The prism sheet 43 may include a plurality of prism patterns, each having, for example, a triangular prism or pyramidal prism shape, and the prism patterns may be arranged adjacent to each other so as to form a plurality of bands. For example, the prism patterns may be repetitive patterns of mountains and valleys, and may protrude in rows toward the display panel 20.

The protection sheet 45 may protect various components included in the back light unit 50 from an external impact or foreign materials. Since the prism sheet 43 is vulnerable to scratches, the protection sheet 45 may prevent the prism sheet 43 from being scratched or reduce scratching of the prism sheet.

The DBEF 47 may be a kind of a polarizing film, and is also called a reflective polarizing film. The DBEF 47 may transmit polarized light incident in a direction that is parallel to the polarizing direction of the DBEF 47, among light emitted from the back light unit 50, and reflect polarized light incident in a direction that is different from the polarizing direction of the DBEF 47, among the light emitted from the back light unit 50.

The light is a traverse wave that vibrates in a direction that is vertical to its propagation direction. The polarizing film may transmit light vibrating in a specific direction and absorb light vibrating in the other directions.

As described above, the DBEF 47 may reflect polarized light incident in a direction that is different from the polarizing direction of the DBEF 47. The reflected light may be recycled in the inside of the back light unit 50, and due to the light recycle, the brightness of the display apparatus 1 may be improved.

The light recycle will be described below.

Figure 5:
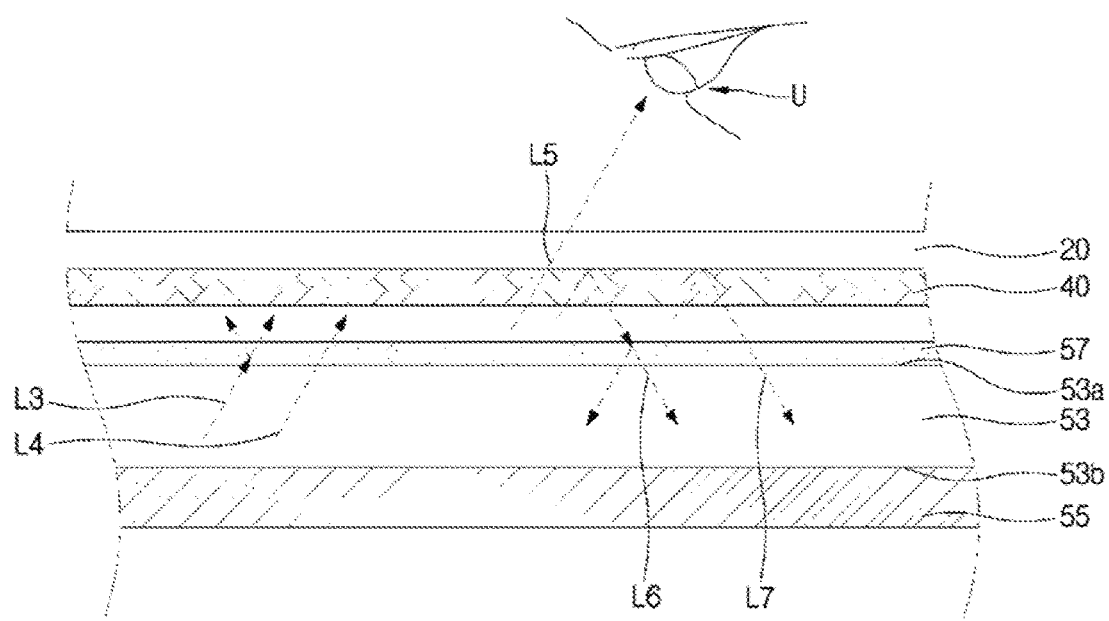
FIG. 5 is a view illustrating one example light recycle in a display apparatus.

FIG. 5 is a view illustrating an example light recycle in the display apparatus 1.

As illustrated in FIG. 5, in the display apparatus 1, various optical phenomena may be generated.

The light L3 and L4 scattered on the front surface 53a of the light guide plate 53, as described above, may enter the quantum dot sheet 57.

At least one part L3 of the light L3 and L4 exiting the light guide plate 53 may be absorbed in the quantum dot sheet 57 to excite electrodes included in the quantum dots QD of the quantum dot sheet 57. The excited electrons included in the quantum dots QD of the quantum dot sheet 57 may return to a stable state to emit light (white light) of various wavelengths.

In other words, due to at least one part L3 of the light L3 and L4 exiting the light guide plate 53, the quantum dot sheet 57 may emit white light.

Also, the other part L4 of the lights L3 and L4 exiting the light guide plate 53 may penetrate the quantum dot sheet 57 without being absorbed in the quantum dot sheet 57. Since the quantum dot sheet 57 is fabricated by distributing quantum dots QD in a resin, space may be formed between the quantum dots QD, and accordingly, the light exiting the light guide plate 53 may penetrate the quantum dot sheet 57 through the space formed between the quantum dots QD.

Accordingly, light exiting the quantum dot sheet 57 may include white light generated by the quantum dot sheet 57 and light penetrated through the quantum dot sheet 57 without change. If the light exiting the light guide plate 53 is blue light emitted from the light source 51, the light exiting the quantum dot sheet 57 may also be light including a blue color.

A part L5 of light L5, L6, and L7 exiting the quantum dot sheet 57 may penetrate the optical sheet 40 and the display panel 20 to be output to the outside of the display apparatus 1. For example, the polarized light L5 propagated in the same direction as the polarizing direction of the DBEF 47 included in the optical sheet 40 can penetrate the optical sheet 40 including the DBEF 47 to be output to the outside of the display apparatus 1 based on driving of the display panel 20.

The light L5 output to the outside of the display apparatus 1 may form an output image of the display apparatus 1.

Also, the other part L6 and L7 of the light L5, L6, and L7 exiting the quantum dot sheet 57 may be reflected from the DBEF 47 of the optical sheet 40 and then again incident to the back light unit 50. For example, the polarized light L6 and L7 propagated in a direction that is different from the polarizing direction of the DBEF 47 included in the optical sheet 40 may be reflected from the DBEF 47 and then incident to the back light unit 50.

The part L6 of the light L6 and L7 reflected from the optical sheet 40 and then incident to the back light unit 50 may be absorbed in the quantum dot sheet 57 to excite electrons included in the quantum dots QD of the quantum dot sheet 57. The excited electrons of the quantum dots QD may return to a stable state to emit light (white light) of various wavelengths.

The other part L7 of the light L6 and L7 reflected from the optical sheet 40 and then incident to the back light unit 50 may penetrate the quantum dot sheet 57 without being absorbed in the quantum dot sheet 57. For example, light reflected from the optical sheet 40 may penetrate the quantum dot sheet 57 through space formed between the quantum dots QD included in the quantum dot sheet 57.

The light reflected from the DBEF 47 of the optical sheet 40 and then incident to the back light unit 50 may be recycled in the back light unit 50 to improve the brightness of the back light unit 50.

While light is recycled, the light may repeatedly pass through the quantum dot sheet 57. Also, the part L3 and L6 of the light L3, L4, L6, and L7 passing through the quantum dot sheet 57 may be absorbed in the quantum dots QD of the quantum dot sheet 57, and due to the light L3 and L6 absorbed in the quantum dots QD, the quantum dot sheet 57 may emit white light.

In other words, while light is recycled in the back light unit 50, white light may increase gradually.

As described above, the light source 51 of the back light unit 50 generally outputs monochromatic light (for example, blue light) of a single wavelength (a single color). The monochromatic light output from the light source 51 may be converted into white light resulting from mixing light of a plurality of wavelengths (various colors) when the light is recycled in the back light unit 50.

As a result, most of light output from the back light unit 50 may become white light.

Since the white light includes light of a plurality of wavelengths (various colors), the white light can improve color gamut of the display apparatus 1.

In this way, the back light unit 50 of the display apparatus 1 can output white light through recycling.

The back light unit 50 according to the current example may include the quantum dot sheet 57 including the second barrier film 57a disposed on the front surface of the fluorescent member 57b, wherein the second barrier film 57a has predetermined reflectivity, in order to further improve the efficiency of light recycle.

Returning again to FIG. 4, the first barrier film 57c may include a first transparent film 57c-2 and a first transparent barrier layer 57c-1 to transmit light, whereas the second barrier film 57a may include a second barrier layer 57a-1 having predetermined reflectivity to reflect a portion of light converted in the fluorescent member 57b backward based on the predetermined reflectivity. The second barrier layer 57a-1 according to the current example may comprise a material having reflectivity in a range of, for example, 4 to 15%.

FIGS. 6A-6C are views illustrating an example of light recycle in the quantum dot sheet 57 of the back light 50 unit.

As illustrated in FIG. 6A, light exiting the light guide plate 53 may be absorbed in the quantum dot sheet 57 to excite electrons of the quantum dots QD included in the fluorescent member 57b of the quantum dot sheet 57. The excited electrons of the quantum dots QD may return to a stable state to generate light (white light) made up of various wavelengths.

A part W1 of the white light generated in the fluorescent member 57b of the quantum dot sheet 57 may exit the quantum dot sheet 57, and the white light W1 exiting the quantum dot sheet 57 may penetrate the optical sheet 40 and the display panel 20 to be output to the outside of the display apparatus 1. For example, polarized light propagated in the same direction as the polarizing direction of the DBEF 47 included in the optical sheet 40 can penetrate the optical sheet 40 including the DBEF 47 to be output to the outside of the display apparatus 1 based on driving of the display panel 20. The light output to the outside of the display apparatus 1 may form an output image of the display apparatus 1.

Also, a part of the light W1 exiting the quantum dot sheet 57 may be reflected from the DBEF 47 of the optical sheet 40 and again incident to the back light unit 50. For example, polarized light propagated in a direction that is different from the polarizing direction of the DBEF 47 included in the optical sheet 40 may be reflected from the DBEF 47 and then again be incident to the back light unit 50.

A part of the light reflected from the optical sheet 40 and then again incident to the back light unit 50 may be absorbed in the quantum dot sheet 57 to excite electrons included in the quantum dots QD of the quantum dot sheet 57. Also, the excited electrons of the quantum dots QD may return to a stable state to emit white light. Recycle of light exiting the quantum dot sheet 57, reflected from the DBEF 47, and then again incident to the back light unit 50 has been described above with reference to FIG. 5, and accordingly, further descriptions thereof will be omitted.

Another part W2 of the light generated in the fluorescent member 57b of the quantum dot sheet 57 may be reflected from the second barrier film 57a to again excite electrons of the quantum dots QD included in the fluorescent member 57b, as illustrated in FIG. 6B. The electrons of the quantum dots QD, excited by the light W2 reflected from the second barrier film 57a may return to a stable state to generate white light W3. The white light W3 may, for example, include more red light and green light portions than the light W2 reflected from the second barrier film 57a.

The light W3 which is recycled light of the light W2 reflected from the second barrier film 57a may be emitted backward from the quantum dot sheet 57, as described above, reflected from the reflector sheet 55, and then again absorbed in the quantum dot sheet 57, as illustrated in FIG. 6C.

The light W3 reflected from the reflector sheet 55 may excite the electrons of the quantum dots QD included in the fluorescent member 57b of the quantum dot sheet 57. The electrons of the quantum dots QD excited by the light W3 may return to a stable state to generate white light. A part W4 of the white light generated in the fluorescent member 57b of the quantum dot sheet 57 may exit the quantum dot sheet 57, wherein the white light W4 may, for example, include more red light and green light portions than the light W3 reflected from the reflector sheet 55. The white light W4 exiting the quantum dot sheet 57 may penetrate the optical sheet 40 and the display panel 20 to be output to the outside of the display apparatus 1.

The other part of the light generated in the fluorescent member 57b of the quantum dot sheet 57 may be again reflected from the second barrier film 57a, as illustrated in FIG. 6B, to excite the electrons of the quantum dots QD included in the fluorescent member 57b.

The light reflected from the second barrier film 57a of the quantum dot sheet 57 and then absorbed in the fluorescent member 57b may be recycled in the quantum dot sheet 57. For example, the process illustrated in FIGS. 6A-6C may be repeatedly performed to recycle light. While light is recycled, the light may repetitively pass through the quantum dot sheet 57 to be absorbed in the quantum dots QD of the quantum dot sheet 57 so that the quantum dot sheet 57 can emit white light by the light absorbed in the quantum dots QD.

In this process, the portions of green light (G) and red light (R) included in the white light may increase so that color coordinates of the green light (G) and the red light (R) may increase. Accordingly, white balance of light exiting the quantum dot sheet 57 may be improved, and the brightness of the back light unit 50 may be improved.

According to the above-described example, only the second barrier film 57a of the quantum dot sheet 57 reflects light, however, the first barrier film 57c can also reflect light, like the second barrier film 57a. The first barrier layer 57c-1 of the first barrier film 57c may be made of a material having reflectivity in a range of, for example, 4 to 15%, like the second barrier layer 57a-1 of the second barrier film 57a.

Figure 7:
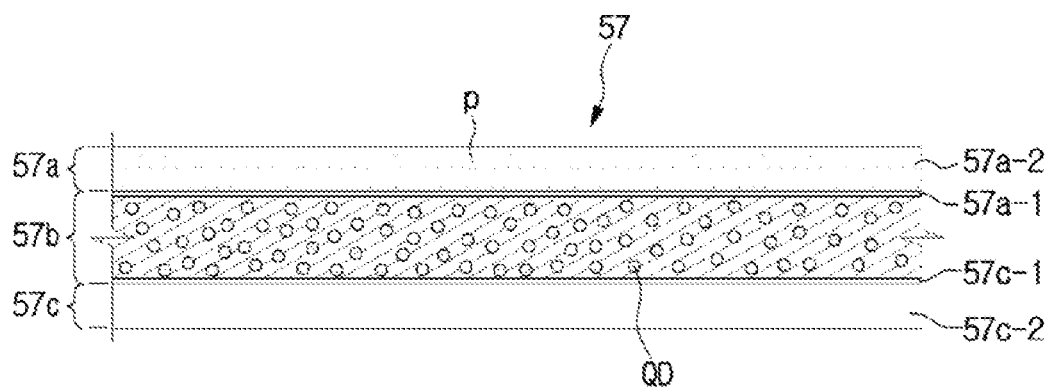
FIG. 7 illustrates an example quantum dot sheet.

FIG. 7 illustrates an example quantum dot sheet.

As illustrated in FIG. 7, the second barrier film 57a may include particles P distributed in the form of haze to scatter light generated in the fluorescent member 57b and then exiting the quantum dot sheet 57 so that a part of the exiting light can be again absorbed in the fluorescent member 57b.

The particles P may be, as illustrated in FIG. 7, included in the second transparent film 57a-2 of the second barrier film 57a. However, the second barrier layer 57a-1 as well as the second transparent film 57a-2 may also include particles P.

Also, the first barrier film 57c as well as the second barrier film 57a may also include particles to scatter light.

Meanwhile, the above-described examples may be combined. For example, the second barrier film 57a may reflect light, as illustrated in FIGS. 6A-6C, and also scatter light so that the light can be absorbed in the fluorescent member 57b, as illustrated in FIG. 7. The first barrier film 57c may also be implemented in the same manner.

The back light unit 50 may include the light source 51, the reflector sheet 55, the light guide plate 53, and the quantum dot sheet 57, as described above. However, the back light unit 50 may further include the optical sheet 40.

In other words, the optical sheet 40 may be separated from the back light unit 50, as in the above-described example, or the optical sheet 40 may be disposed on the front surface of the quantum dot sheet 57 and included in the back light unit 50. For example, the back light unit 50 may include the optical sheet 40 in addition to the above-mentioned components. FIGS. 8 to 11 illustrate back light units 50 according to various examples.

Figure 8:
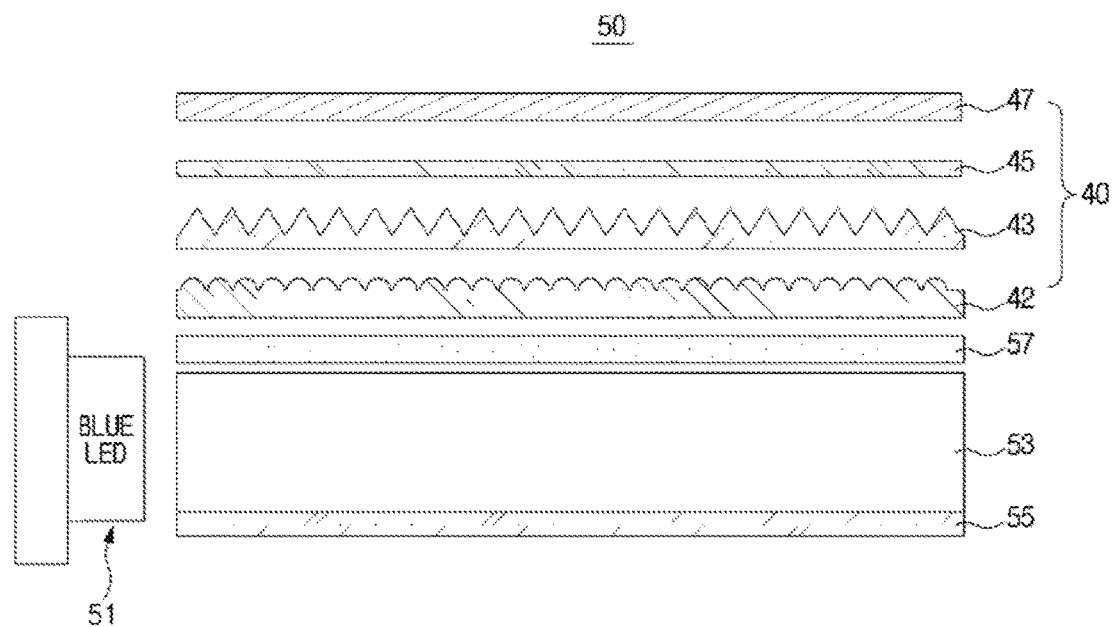
FIGS. 8 to 11 illustrate example back light units.

As illustrated in FIG. 8, the back light unit 50 may include the light source 51, the reflector sheet 55, the light guide plate 53, the quantum dot sheet 57, and the optical sheet 40 disposed on the front surface of the quantum dot sheet 57.

The optical sheet 40 may include a microlens sheet 42 to help light recycle, the prism sheet 43, and the DBEF 47, as illustrated in FIG. 8.

Also, the optical sheet 40 may further include the protection sheet 45 to protect various components included in the back light unit 50 from an external impact or foreign materials. Since the prism sheet 43 is vulnerable to scratches, the protection sheet 45 may protect the prism sheet 43 from being scratched.

Since the optical sheet 40 reflects a part of light exiting the quantum dot sheet 57 to enable light recycle, the optical sheet 40 may improve the efficiency of light recycle together with the second barrier film 57a having reflectivity.

According to examples, the back light unit 50 may include the quantum dot sheet 57 including the second barrier film 57a having reflectivity, and the optical sheet 40 including all of the microlens sheet 42, the prism sheet 43, and the DBEF 47, the optical sheet 40 disposed on the front surface of the quantum dot sheet 57, or the back light unit 50 may include the quantum dot sheet 57 including the second barrier film 57a having reflectivity, and any one or at least one of the microlens sheet 42, the prism sheet 43, and the DBEF 47, disposed on the front surface of the quantum dot sheet 57.

Figure 9:
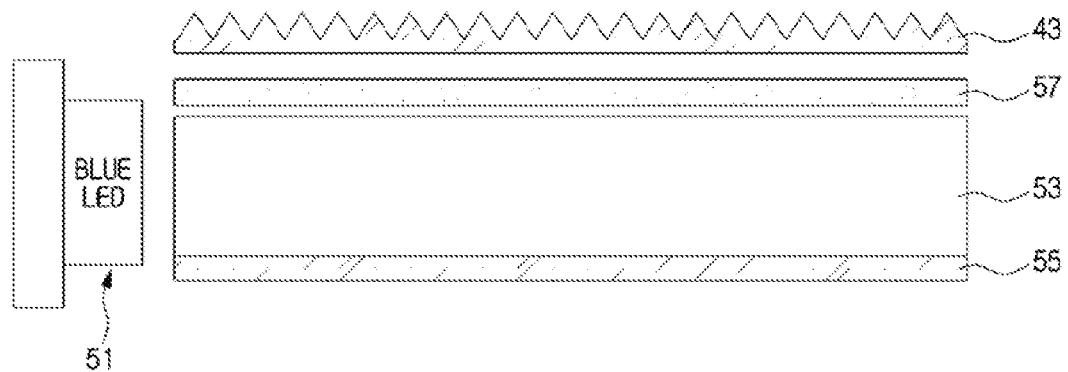

For example, as illustrated in FIG. 9, the back light unit 50 may include the quantum dot sheet 57 including the second barrier film 57a having reflectivity, and the prism sheet 43 disposed on the front surface of the quantum dot sheet 57. Or the back light unit 50 may include the quantum dot sheet 57 including the second barrier film 57a having no reflectivity, and the prism sheet 43 disposed on the front surface of the quantum dot sheet 57.

The prism sheet 43 may refract or focus light exiting the quantum dot sheet 57 to thereby increase brightness, and also reflect light exiting the quantum dot sheet 57 to the quantum dot sheet 57 to aid in light recycle.

If the second barrier film 57a of the quantum dot sheet 57 has reflectivity, a combination of the quantum dot sheet 57 and the prism sheet 43 may enable efficient light recycle. However, even when the second barrier film 57a has no reflectivity, light may be reflected by the prism sheet 43 so that the light can be recycled in the quantum dot sheet 57.

The prism sheet 43 may include a plurality of prism patterns, each having a triangular or pyramidal prism shape, and the prism patterns may be arranged adjacent to each other so as to form a plurality of bands. For example, the prism patterns may be repetitive patterns of mountains and valleys, and may protrude in rows toward the display panel 20.

Figure 10:
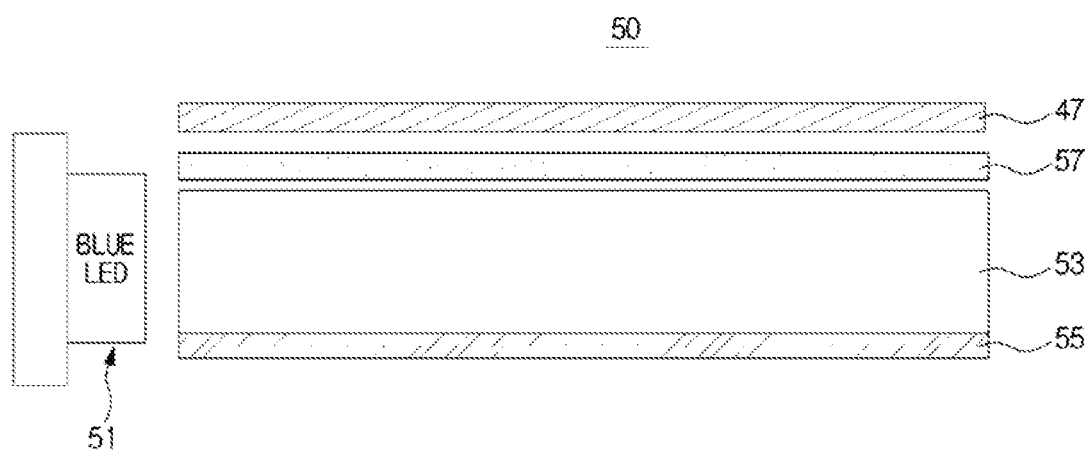

Also, as illustrated in FIG. 10, the back light unit 50 may include the quantum dot sheet 57 having the second barrier film 57a having reflectivity, and the DBEF 47 disposed on the front surface of the quantum dot sheet 57. Or, the back light unit 50 may include the quantum dot sheet 57 having the second barrier film 57a having no reflectivity, and the DBEF 47 disposed on the front surface of the quantum dot sheet 57.

The DBEF 47 may be a kind of a polarizing film, and also called a reflective polarizing film. The DBEF 47 may transmit polarized light propagated in a direction that is parallel to the polarizing direction of the DBEF 47, among light emitted from the back light unit 50, and reflect polarized light propagated in a direction that is different from the polarizing direction of the DBEF 47, among the light emitted from the back light unit 50.

The light is a traverse wave that vibrates in a direction that is vertical to its propagation direction. The polarizing film may transmit light vibrating in a specific direction and absorb light vibrating in the other directions.

The DBEF 47 may reflect polarized light propagated in a direction that is different from the polarizing direction of the DBEF 47, as described above. The reflected light may be recycled in the inside of the back light unit 50.

If the second barrier film 57a of the quantum dot sheet 57 has reflectivity, a combination of the quantum dot sheet 57 and the DBEF 47 may enable efficient light recycle. However, even when the second barrier film 57a has no reflectivity, light may be reflected by the DBEF 47 so that light can be recycled in the quantum dot sheet 57.

Figure 11:
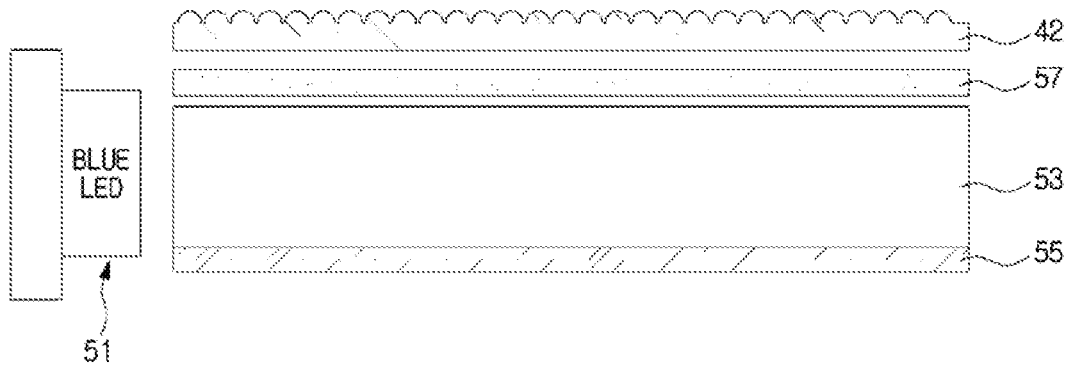

Also, as illustrated in FIG. 11, the back light unit 50 may include the quantum dot sheet 57 including the second barrier film 57a having reflectivity, and the microlens sheet 42 disposed on the front surface of the quantum dot sheet 57. Or, the back light unit 50 may include the quantum dot sheet 57 including the second barrier film 57a having no reflectivity, and the microlens sheet 42 disposed on the front surface of the quantum dot sheet 57.

The microlens sheet 42 may refract or focus light exiting the quantum dot sheet 57, like the prism sheet 43, to thereby increase the brightness of the light, and reflect light exiting the quantum dot sheet 57 to the quantum dot sheet 57 to thereby aid in light recycle.

If the second barrier film 57a of the quantum dot sheet 57 has reflectivity, a combination of the quantum dot sheet 57 and the prism sheet 43 may enable efficient light recycle. However, even when the second barrier film 57a has no reflectivity, light may be reflected by the microlens sheet 42 so that the light can be recycled in the quantum dot sheet 57.

The microlens sheet 42 may have an arrangement of microlenses, each having, for example, a raised hemispherical shape, on a sheet. For example, the microlens may protrude in the shape of a raised hemisphere on one surface of a sheet, like a lenticular lens. The microlenses may be arranged at regular intervals on the sheet, however, the microlenses may be arranged randomly.

The microlens may comprise a transparent polymer resin. The transparent polymer resin may, for example, include acrylic, polycarbonate, polypropylene, polyethylene, or polyethylene terephthalate. The bottom of the microlens may, for example, be in the shape of a circle, an ellipse, or a regular hexagon.

The back light unit 50 may include all of the microlens sheet 42, the prism sheet 43, and the DBEF 47, as illustrated in FIG. 8, or the back light unit 50 may include any one of the microlens sheet 42, the prism sheet 43, and the DBEF 47, as illustrated in FIGS. 9 to 11. Or, the back light unit 50 may include two components selected from among the microlens sheet 42, the prism sheet 43, and the DBEF 47.

In the back light unit and the display apparatus including the back light unit according to the examples of the disclosure, by recycling light converted by quantum dots, it is possible to improve light efficiency and white balance, without increasing an amount of quantum dots.

Although various examples of the disclosure have been illustrated and described, it would be appreciated by those skilled in the art that changes may be made in these examples without departing from the principles and spirit of the disclosure, the scope of which is defined in the claims and their equivalents.

What is claimed is:

1. A back light unit comprising:
a light source; and
a quantum dot sheet configured to convert light generated in the light source into white light,
wherein the quantum dot sheet comprises:
a fluorescent member including quantum dots;
a first barrier film disposed on a rear surface of the fluorescent member; and
a second barrier film disposed on a front surface of the fluorescent member, said second barrier film having a predetermined reflectivity to reflect the white light converted by the fluorescent member toward the fluorescent member.

2. The back light unit according to claim 1, wherein the predetermined reflectivity of the second barrier film is in a range of 4 to 15%.

3. The back light unit according to claim 1, wherein the second barrier film reflects portions of red light, green light, and blue light converted by the fluorescent member backward toward the fluorescent member.

4. The back light unit according to claim 1, further comprising a reflector sheet provided behind the quantum dot sheet, and configured to reflect light propagated backward from the quantum dot sheet toward the quantum dot sheet.

5. The back light unit according to claim 1, wherein the light source includes a light emitting diode configured to generate blue light.

6. The back light unit according to claim 1, further comprising an optical sheet provided in front of the quantum dot sheet, and configured to refract or reflect light output from the quantum dot sheet.

7. The back light unit according to claim 6, wherein the optical sheet comprises at least one of: a microlens sheet, a prism sheet, and a Double Brightness Enhancement Film (DBEF).

8. The back light unit according to claim 1, wherein the second barrier film includes particles that scatter white light converted by the fluorescent member.

9. The back light unit according to claim 1, further comprising:
- a light guide plate provided on the rear surface of the quantum dot sheet, said light guide plate configured to scatter light generated in the light source and to emit the scattered light through a front surface of the light guide plate; and
- a reflector sheet disposed behind the light guide plate, said reflector sheet configured to reflect light exiting the rear surface of the light guide plate toward the light guide plate.

10. A quantum dot sheet comprising:
- a fluorescent member including quantum dots;
- a first barrier film disposed on the rear surface of the fluorescent member; and
- a second barrier film disposed on the front surface of the fluorescent member, said second barrier film having a predetermined reflectivity, and being configured to reflect white light converted by the fluorescent member backward toward the fluorescent member.

11. A display apparatus comprising:
- a display panel;
- a back light unit configured to output light to the display panel; and
- an optical sheet configured to refract or reflect light output from the back light unit and to provide the refracted or reflected light to the display panel, wherein the back light unit comprises:
- a light source; and
- a quantum dot sheet configured to convert light generated in the light source into white light, and to reflect a portion of the white light backward toward the light source.

12. The display apparatus according to claim 11, wherein the quantum dot sheet comprises:
- a fluorescent member including quantum dots;
- a first barrier film disposed on a rear surface of the fluorescent member; and
- a second barrier film disposed on a front surface of the fluorescent member, said second barrier film having a predetermined reflectivity, and being configured to reflect white light converted by the fluorescent member backward toward the fluorescent member.

13. The display apparatus according to claim 12, wherein the second barrier film has reflectivity in a range of 4 to 15%.

14. The display apparatus according to claim 12, wherein the second barrier film reflects portions of red light, green light, and blue light converted by the fluorescent member backward toward the fluorescent member.

15. The display apparatus according to claim 11, further comprising a reflector sheet provided behind the quantum dot sheet, and configured to reflect light propagated backward from the quantum dot sheet toward the quantum dot sheet.

16. The display apparatus according to claim 11, wherein the light source includes a light emitting diode configured to generate blue light.

17. The display apparatus according to claim 11, wherein the optical sheet comprises at least one of: a microlens sheet, a prism sheet, and a Double Brightness Enhancement Film (DBEF).

18. The display apparatus according to claim 11, wherein the second barrier film includes particles to scatter white light converted by the fluorescent member.

19. The display apparatus according to claim 11, further comprising:
- a light guide plate provided on the rear surface of the quantum dot sheet, and configured to scatter the light generated in the light source and to emit the scattered light through a front surface of the light guide plate; and
- a reflector sheet disposed behind the light guide plate and configured to reflect light exiting a rear surface of the light guide plate toward the light guide plate.

* * * * *